United States Patent
Kato et al.

(10) Patent No.: US 8,045,321 B2
(45) Date of Patent: Oct. 25, 2011

(54) RESIN-COATED ALUMINUM ALLOY SHEET MATERIAL FOR ALUMINUM ELECTROLYTIC CAPACITOR CASE, CASE FOR ALUMINUM ELECTROLYTIC CAPACITOR, AND ALUMINUM ELECTROLYTIC CAPACITOR

(75) Inventors: Osamu Kato, Tokyo (JP); Toshiki Maezono, Tokyo (JP); Masatsugu Saito, Tokyo (JP)

(73) Assignee: Furukawa-sky Aluminum Corp., Tokyo (JP)

( * ) Notice: Subject to any disclaimer, the term of this patent is extended or adjusted under 35 U.S.C. 154(b) by 414 days.

(21) Appl. No.: 12/309,003

(22) PCT Filed: Jan. 11, 2008

(86) PCT No.: PCT/JP2008/050239
§ 371 (c)(1),
(2), (4) Date: Dec. 31, 2008

(87) PCT Pub. No.: WO2008/084839
PCT Pub. Date: Jul. 17, 2008

(65) Prior Publication Data
US 2009/0237864 A1      Sep. 24, 2009

(30) Foreign Application Priority Data
Jan. 12, 2007   (JP) .................................. 2007-005224

(51) Int. Cl.
*H01G 2/10* (2006.01)
*H01G 9/08* (2006.01)

(52) U.S. Cl. ...................................... 361/517; 361/535
(58) Field of Classification Search .......... 361/517–521, 361/535–538
See application file for complete search history.

(56) References Cited

U.S. PATENT DOCUMENTS

| | | | |
|---|---|---|---|
| 4,250,534 A | * | 2/1981 | Brown et al. .................. 361/272 |
| 6,307,734 B1 | * | 10/2001 | Bruvelaitis et al. ........... 361/513 |
| 2003/0154885 A1 | | 8/2003 | Krendlinger et al. |
| 2006/0210817 A1 | | 9/2006 | Yamanaka et al. |
| 2008/0194744 A1 | | 8/2008 | Ok et al. |

FOREIGN PATENT DOCUMENTS

| | | | |
|---|---|---|---|
| JP | 63268241 A | * | 11/1988 |
| JP | 4-338624 | | 11/1992 |
| JP | 6-166138 (A) | | 6/1994 |
| JP | 7-166125 (A) | | 6/1995 |

(Continued)

*Primary Examiner* — Eric Thomas
(74) *Attorney, Agent, or Firm* — Carrier Blackman & Associates, P.C.; Joseph P. Carrier; William D. Blackman

(57) ABSTRACT

A resin-coated aluminum alloy sheet material for an aluminum electrolytic capacitor case includes a resin layer that contains wax composed of at least one of polyethylene wax and carnauba wax, and has a thickness falling within a range from at least 2 μm to at most 22 μm. A total of lengths of wax particles, defined when the wax particles are cut along a straight line of 100 μm optionally drawn on the surface of the resin layer, is at least 10 μm. A number of the wax particles, featured by a cross-sectional shape having a size of at most 80% of the thickness of the resin layer and of at least 0.1 μm, is from at least 3 to at most 50. A number of the wax particles, featured by a cross-sectional shape featured by a major axis extent having a size of more than 80% of the thickness of the resin layer is less than 10.

13 Claims, 2 Drawing Sheets

FOREIGN PATENT DOCUMENTS

| | | |
|---|---|---|
| JP | 07-195031 | 8/1995 |
| JP | 7-207040 | 8/1995 |
| JP | 11-244778 (A) | 9/1999 |
| JP | 2000-176372 (A) | 6/2000 |
| JP | 2002-319523 A | 10/2002 |
| JP | 2004-143418 | 5/2004 |
| JP | 2004-314415 (A) | 11/2004 |
| JP | 2005-288980 (A) | 10/2005 |
| JP | 2006-334917 (A) | 12/2006 |
| WO | 2006/126755 A1 | 11/2006 |

* cited by examiner

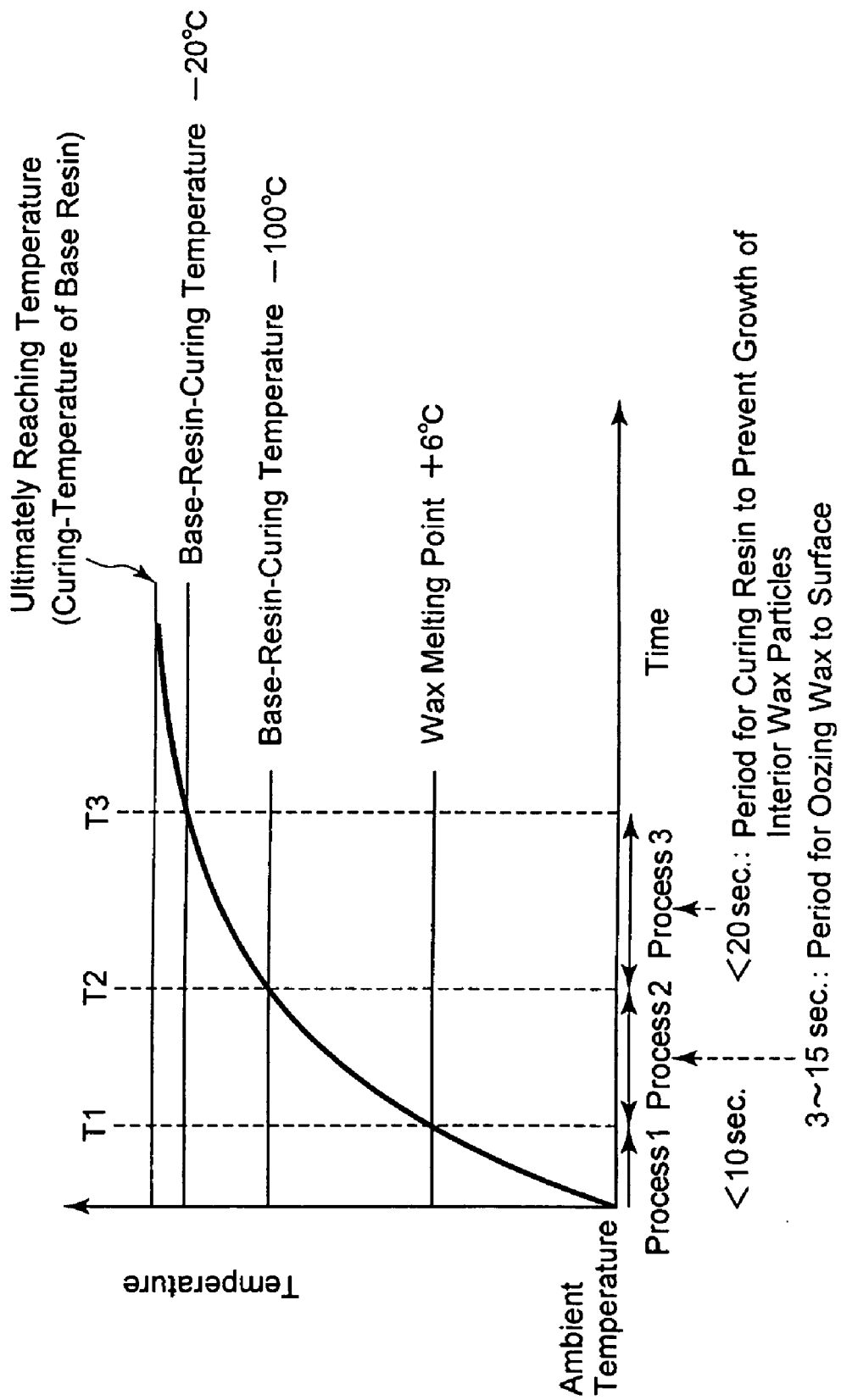

RESIN-COATED ALUMINUM ALLOY SHEET MATERIAL FOR ALUMINUM ELECTROLYTIC CAPACITOR CASE, CASE FOR ALUMINUM ELECTROLYTIC CAPACITOR, AND ALUMINUM ELECTROLYTIC CAPACITOR

FIELD OF THE INVENTION

The present invention relates to a resin-coated aluminum alloy sheet material featuring superior formability to a deep drawing and ironing, and more particularly, relates to such a resin-coated aluminum alloy sheet material useful to a case for an aluminum electrolytic capacitor, such an aluminum electrolytic capacitor case, and such an aluminum electrolytic capacitor.

BACKGROUND OF ART

Recently, a resin-coated aluminum alloy sheet material, which does not need an insulative resin-coating process after a formation process, is used as a material for an aluminum electrolytic capacitor case. Due to the fact that this aluminum electrolytic capacitor case material is subjected to a severe formation process including a combination of a deep drawing and an ironing, if a usual resin-coated aluminum alloy sheet material for buildings or the like is used instead, cracks, peelings and so forth occur in the resin layer thereof, and thus a sufficient insulative property can not be ensured. Also, a formation process using a volatile press oil, which does not need a solvent degreasing process, prevails in order to obey the recent regulation of solvent, and thus requires a higher formability in comparison with a conventional formation process using a high viscosity oil.

On the other hand, it is well known that addition of a solid lubricant such as wax is effective in improving a formability of a resin-coated aluminum alloy sheet material. In a case where a resin layer is formed by a coating process, when wax is added to a coating material, a part (or all) of the wax cures in the state of existing on a surface of the resin layer due to the fact that the wax generally features a smaller surface energy than that of a base resin as a main component of the resin layer. When the resin-coated aluminum alloy sheet material so produced is subjected to a press formation process, the wax existing on the surface of the resin layer acts as a lubricant, and thus a press tool can smoothly slide on the surface of the resin layer so that cracks or peelings can not easily occur in the resin layer during the press formation process.

Then, a production method for a resin-coated aluminum alloy sheet material, featuring addition of wax for an improvement of the formability, has been proposed.

For example, Patent Document 1 discloses a coated metal web featuring a superior formability to an ironing, wherein, in the coated metal web material containing inner wax for a multi-stage ironing formation, regarding wax particles observed in a direction of a cross-section of a coated layer by a transmission electron microscope, a cross-sectional area of the wax particles, existing in a depth measured from the uppermost surface of a coated layer to a distance of (100−Ya)×Z/100) before an a-th formation stage, is at least 3%: Ya % is a reduction rate of a thickness of the coated layer when it is subjected to the a-th formation stage; and Z(μm) is a thickness of the coated layer before it is subjected to the a-th formation stage.

Also, Patent Document 2 discloses a production method for producing aluminum alloy sheet material for can end, wherein a coating process for coating a metal sheet with a coating material containing wax is carried out in such a manner that a temperature of the metal sheet is controlled at 110° C. after 5 seconds from the start of the coating process, and that it is then controlled at most 180° C. after 10 seconds from the start of the coating process.

The above-mentioned methods are directed to an improvement of the formability by giving a surface of a resin layer a superior lubricant property, and by making a press tool smoothly slide thereon. On the other hand, by giving a resin layer a large stretchability, progress a followingability of the resin layer to deformation of an aluminum alloy sheet material is also effective in the improvement of the formability. As a measure to give the resin layer the large stretchability, increasing a molecular weight of a base resin material of the resin layer is included.

As an example of the improvement of the formability by controlling a molecular weight of epoxy-series resin, for example, Patent Document 3 discloses a resin-coated aluminum alloy sheet material for a capacitor case, which is characterized by the fact that a resin material of the resin layer includes an epoxy-series resin as a main component, and at least one or no less than two resin materials selected from the group consisting of a phenolic resin, an acrylic resin, a urethane resin and a urea resin, features a number average molecular weight falling within a range from 5,000 to 30,000, and contains a lubricant of 0.1 to 10 weight parts per 100 weight pats of the resin, the tensile strength of the resin layer being at least 40 N/mm$^2$, the elongation of the resin layer being at least 2%, the thickness of the resin layer falling within a range from 3 μm to 30 μm, and that a cross-cut survival rate in a cross-cut test is at least 60% when the resin-coated aluminum alloy sheet material is rolled at a rolling ratio of 40%. (Note: in this document, it is stated that a more preferable range for the number average molecular weight is from 10,000 to 20,000.)

Also, Patent Document 4 discloses a lubricated steel sheet for cans which is excellent in a drawing/ironing formability, wherein a surface of the lubricated steel sheet, which is defined as an inner wall face of a can, is coated with a coating composition composed of an epoxy resin featuring an number average molecular weight falling within a range from 2,000 to 100,000 and an epoxy equivalent weight falling within a range from 1,500 to 50,000, and wax featuring a softening point of at least 30° C., so that a coated layer is formed on the inner wall surface in a dry-coating weight falling within a range from 10-85 mg/100 cm$^2$, the coated layer having a coefficient of dynamic friction falling within a range from 0.03 to 0.20 at the temperature of 60° C., and a pencil hardness of at least "H" at the temperature of 60° C. In Patent Document 4, it is stated that a more preferable range for the average molecular weight is from 3,000 to 70,000, and it is specified in a sub-claim that the wax is composed of at least one kind of wax selected from the group consisting of esters of fatty acid-series wax, fluorine-series wax, polyolefin-series wax, lanolin-series wax, montan wax, microcrystalline wax and carnauba wax.

Patent Document 1: JP-2005-288980 A
Patent Document 2: JP-H11-244778 A
Patent Document 3: JP-2006-334917 A
Patent Document 4: JP-2004-314415 A

DISCLOSURE OF THE INVENTION

Problems to be Solved by the Invention

Certainly, in forming a case for an aluminum electrolytic capacitor, addition of wax to a resin-coated aluminum alloy sheet material is effective in improving a formability thereof. Nevertheless, when the aluminum electrolytic capacitor case has a large height/diameter ratio, a resin layer must be extensively stretched, and thus sufficient lubrication can not be obtained by only wax existing on a surface of the resin layer, so that damage may occur in the resin layer. Accordingly, it can not be said that a sufficient formability can be obtained in an application of the aluminum electrolytic capacitor case having a large height/diameter ratio.

For example, the metal sheet disclosed in Patent Document 1 is used in production of cans which are subjected to a conventional ironing formation process, and is defined as the coated metal sheet which is intended to eliminate a degreasing process and a coating process after the ironing formation process, the cross-sectional area of the wax particles, which exist in the depth measured from the uppermost surface of the coated layer to the distance of $(100-Ya) \times Z/100)$ before the a-th formation stage, being controlled so as to be at least 3% to thereby improve the formability for the ironing formation process. However, although the minimum cross-sectional area of the wax particles is regulated under the specific conditions, uniform distribution of the wax particles can not be sufficiently ensured. Thus, when an excess amount of wax particles exists in the coated layer, it can be easily presumed that the coated layer is susceptible to rupture because the excess amount of wax particles causes a rupture occurring point of the coated layer.

Accordingly, although the metal sheet disclosed in Patent Document 1 is used to produce a case for an aluminum electrolytic capacitor featuring a large height/diameter ratio by a deep drawing formation process and an ironing formation process using a volatile press oil, it is impossible to solve the problem in which the coated layer is subjected to damage due to a local lock of lubrication and a lock of strength in the coated layer.

Also, in Patent Document 2, when the coating material containing wax, with which the aluminum alloy sheet is coated, is baked, the temperature of the metal sheet is controlled after respective 5 seconds and 10 seconds from the start of the baking process, and it is disclosed as an embodiment by way of example that polyethylene wax, carnauba wax and lanolin wax are added to an epoxy-urea-series coating material at 5% of respective kinds of wax to a solid content of the epoxy-urea-series coating material.

However, although an aluminum alloy sheet was coated with the coating material, and although the coated resin layer was baked under the conditions as stated in Patent Document 2, a formability of this resin-coated aluminum alloy sheet was insufficient in forming an aluminum electrolytic capacitor case featuring a large height/diameter ratio, and thus there were a case where damage occurred in the resin layer. It might be presumed that this results from the fact that there might be a case where the wax particles was distributed in the resin layer to cause an insufficient lubricating state in forming the aluminum electrolytic capacitor case featuring the large height/diameter ratio by using a volatile press oil because the distribution of the wax particles was changed in the resin layer in dependence upon a kind of wax and a size of wax particles although polyethylene wax and carnauba wax were added to the epoxy-urea-series coating material and although the temperature of the metal sheet is controlled after the respective 5 seconds and 10 seconds from the start of the baking process. The aluminum electrolytic capacitor case features the height/diameter ratio of approximately 1.1 to 1.7, whereas a can end features a height/diameter ratio (unit- depth/curl-dia. ratio) of approximately 0.13. Although the resin-coated aluminum alloy sheet material concerned could be used for can end without any problems, the lubricating property of the resin layer was insufficient in forming the aluminum electrolytic capacitor case featuring the large height/diameter ratio, so that damages might occur in the resin layer.

Also, in a resin-coated aluminum sheet material in which a coated layer as disclosed in Patent Document 3 or 4 is formed on an aluminum sheet, when a formation process of the resin-coated aluminum sheet material was carried out by using a volatile press oil, there was a case where a lubricating property of the coated layer might be insufficient in dependence upon a distribution of wax particles to result in occurrence of cracks in the coated layer after the formation process, so that an sufficient formability could not obtained. Especially, in a case for an aluminum electrolytic capacitor featuring a large height/diameter ratio, the resin layer was extensively stretched, and thus sufficient lubrication could not be obtained by only wax existing on the coated layer, so that damage might occur in the coated layer. Thus, it cannot be said that the resin-coated aluminum alloy sheet material concerned exhibits a sufficient formability in application of the aluminum electrolytic capacitor case featuring the large height/diameter ratio.

In view of the problems of the above-mentioned prior arts, an object of the present invention is to provide a resin-coated aluminum alloy sheet material for an aluminum electrolytic capacitor case which can exhibit superior formability although such aluminum electrolytic capacitor case featuring a large height/diameter ratio is formed by using a volatile press oil, and to provide a case for an aluminum electrolytic capacitor, and such an aluminum electrolytic capacitor.

Means for Solving the Problems

The inventors produced resin layers using a variety of kinds of wax under a variety of conditions, studied a relationships between a wax-existing state on a surface of a resin layer and a wax-existing state in an interior of the resin layer, and found as the studying results that, although a resin-coated aluminum alloy sheet material was formed into an aluminum electrolytic capacitor case featuring a large height/diameter ratio, cracks, peelings and so forth could not occur in the resin layer after the formation process by regulating a size of wax particles and a number of wax particles in the interior of the resin layer and by concretely controlling the formation process so that wax oozed from the interior of the resin layer when the resin layer stretched, resulting in the completion of the present invention.

Further, the inventors defined a resin layer on an aluminum sheet material by using an epoxy-series resin having a variety of molecular weights as a main component, formed it into a capacitor case by using a volatile press oil, and then studied a formability thereof. As a result, it was found that, when the main component of the resin layer was an epoxy-series resin having a specific molecular weight, it exhibited a superior formability.

In particular, a resin-coated aluminum alloy sheet material for an aluminum electrolytic capacitor case according to the present invention comprises a resin layer containing wax composed of at least one of polyethylene wax and carnauba wax, characterized in that the resin layer has a cross-section thickness falling within a range from at least 2 µm to at most 22 µm when being cut in a direction perpendicular to a surface of the resin layer, that a total of lengths of wax particles, which are defined when the wax particles are cut along a straight line of 100 µm optionally drawn on the surface of the resin layer, is at least 10 µm, that a number of the wax particles, which have a cross-sectional shape featured by a major axis extent having a length of at most 80% of the thickness of the resin layer and of at least 0.1 μm, and which exist in a cross-sectional area of the resin layer defined by using the straight line of 100 μm as a side thereof, falls within a range from at least 3 to at most 50, and that a number of the wax particles, which have a cross-sectional shape featured by a major axis extent having a length of more than 80% of the thickness of the resin layer, and which exist in the cross-sectional area of the resin layer defined by using the straight line of 100 μm as a side thereof, is less than 10.

In the forgoing, the aluminum alloy sheet material may includes a pure aluminum sheet material.

The aforesaid wax may feature a rate of polyethylene wax to carnauba wax falling within a range between 1:4 and 4:1.

It is preferable that a resin forming the aforesaid resin layer is either an epoxy-series resin or a polyester-series resin. It is more preferable that the resin forming the resin layer includes the epoxy-series resin having a number average molecular weight falling within a range from at least 5,000 to at most 13,000 as a main component.

An aluminum electrolytic capacitor case using the aforesaid resin-coated aluminum alloy sheet material is preferable.

An aluminum electrolytic capacitor using the aforesaid aluminum electrolytic capacitor case is preferable.

Effects of the Invention

With the resin-coated aluminum alloy sheet material for the aluminum electrolytic capacitor case according to the present invention, although a formation process for the capacitor case featuring a large height/diameter ratio is carried out by using a volatile press oil, it is possible to obtain a sufficient electrical insulation property.

BRIEF EXPLANATIONS OF DRAWINGS

FIG. 2 is an explanatory view illustrating relationships among a variation of temperature, a wax-melting process and a resin-curing temperature during a baling process for a coating material in the course of production of a resin-coated aluminum alloy sheet material for an aluminum electrolytic capacitor case according to the present invention.

EXPLANATION OF REFERENCES

Figure 1:
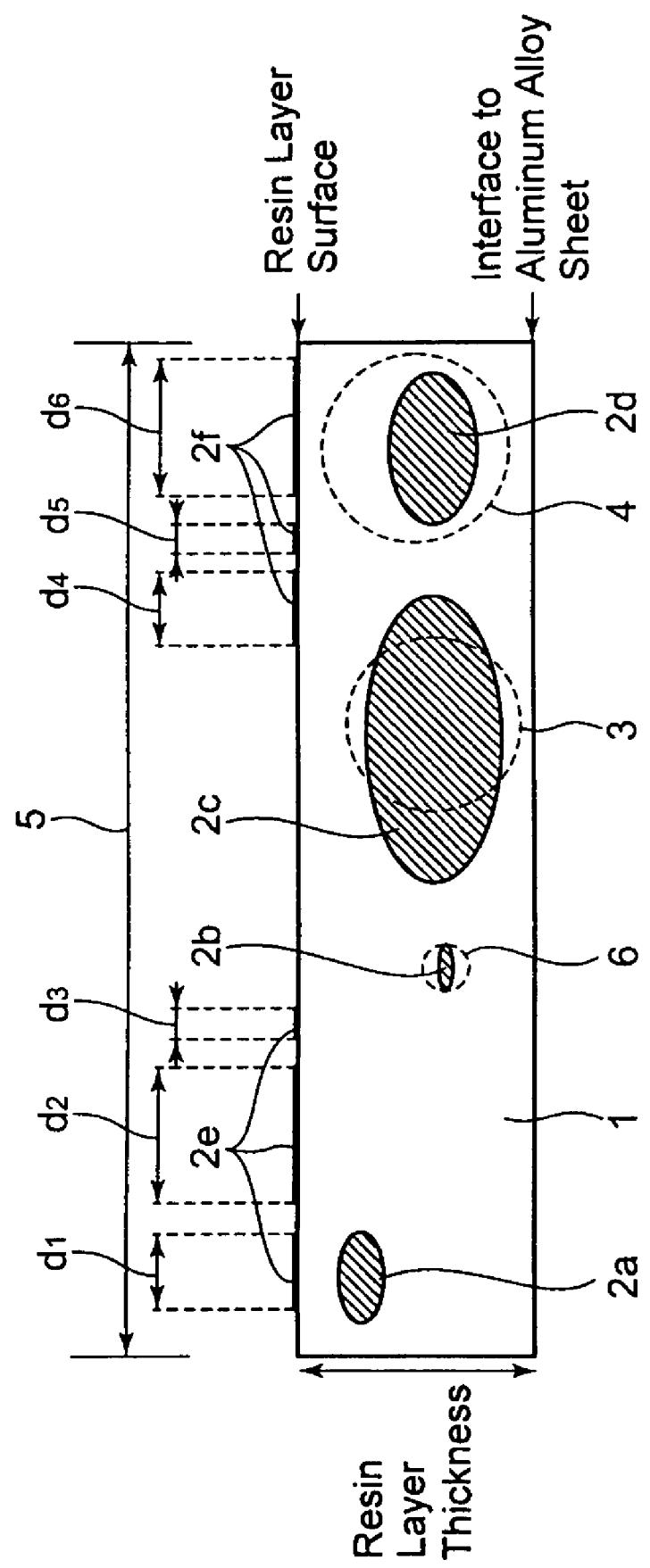
FIG. 1 is a typical view visually illustrating a wax-existing state of a variety of wax particles 2a to 2d in an interior of a resin layer 1.

1 . . . Resin Layer
2 . . . Wax Particles
5 . . . Straight Line Extent of 100 μm The Best Modes for Embodying the Invention The best modes for embodying the present invention will now be explained below.

(1) Analysis of Cross-Sectional State of Resin Layer

In embodying the present invention, only a resin layer is removed from an resin-coated aluminum alloy sheet material by dissolving an aluminum alloy material thereof, the removed resin layer is colored with ruthenic acid, the colored resin layer is embedded in an epoxy resin, the embedded resin layer is sliced into an ultra thin film by a ultramicrotome, and then a cross-sectional state of the resin layer is observed by a transmission electron microscope.

Like this, when the observation of the cross-sectional state of the resin layer is carried out, as shown in FIG. 1, the wax on a surface of the resin layer is observed as linear lines extending in parallel to the surface of the resin layer, whereas the wax in an interior of the resin layer is observed as circular shapes or ellipsoidal-like shapes. In general, since the wax features a smaller surface energy than that of the resin material, the wax has a tendency to ooze toward the surface of the resin layer and the oozed wax becomes to wetly and flatly extend thereon, and thus the wax is observed as the linear lines in the cross-sectional view of the resin layer.

(2) Definition of Wax Particles in Cross-Sectional Area of Resin Layer

FIG. 1 is a typical view visually illustrating a wax-existing state of a variety of wax particles 2a to 2d in the interior of the resin layer 1, the resin layer 1 has the interface to the aluminum alloy sheet, the surface of the resin layer 1 is defined as the one opposed to that interface. In the process for the formation of the resin layer 1, the wax particles 2a to 2d in the interior of the resin layer have a liquid state within the liquid resin phase, and thus the wax particles have a tendency to equilibrium-theoretically become a shape having the smallest interface shape to the liquid resin, i.e., a spheral shape. However, in reality, the baking process for the coating material is carried out in a relatively short time, and thus the wax particles 2a to 2d have a metastable shape which is obtained prior to the equilibrium condition.

This metastable shape is an ellipsoidal-like shape featuring a small difference between a major axis and a minor axis in its cross-sectional view before a completely-spheral shape is obtained, or otherwise a distorted spheral shape. On the other hand, although the baking process for the coating material is carried out in the relatively short time, the wax particles hardly become an ellipsoidal-like shape or a needle-like shape featuring a large interface-area/volume ratio, i.e., a large difference between the major axis and the minor axis. Accordingly, in evaluation for the cross-sectional state of the resin layer 1, a wax-particle shape can be estimated by defining a size of the wax particles 2a to 2d in comparison with a completely spheral shape having a circular shape in its cross-sectional view.

Thus, in the definition of the wax particles in the cross-sectional state of the resin layer according to the present invention, as shown in FIG. 1, a wax particle featuring a major axis extent (which is defined as a diameter section if the wax particle is circular in its cross-sectional view) of at least x μm is defined as the wax particle 2c featuring a larger cross-sectional shape than that of a circle 3 having a diameter of x μm. The cross-sectional shape of the wax particle 2c is not encompassed by the circle 3 so that the major axis section is outwardly extended from the circle 3 when the circle 3 is put over the cross-section of the wax particle 2c. Also, the wax particle 2d having the cross-sectional shape, a major axis extent of which is at most y % of the thickness of the resin layer 1, is defined as the wax particle 2d having a smaller cross-sectional shape than a circle 4 having a diameter of z μm (=the resin layer thickness×y/100) which is at most y % of the thickness of the resin layer 1 shown in FIG. 1. The cross-sectional shape of the wax particle 2d is encompassed by the circle 4 without being outwardly extended therefrom when the circle 4 is put over the cross-section of the wax particle 2d.

Note, since it is difficult to obtain an ultra thin film having the length of just 100 μm, when countering a number of wax particles in the interior of the resin layer, a number of wax particles is counted over the full length of an obtained ultra thin film, and then is converted into a numerical value per 100 μm.

Also, as a result of studying a variety of distributions of wax particles, if a resin layer was formed by a process as stated hereinafter, it was found that dispersion of particles was small in its distribution. In particular, a major part of the wax particles had a size falling within a range from about 0.1 μm to about 10 μm. Thus, if distributions of wax particles measured at several areas in the length on the order of 100 μm were averaged, it would be possible to decide that the averaged value represented a whole distribution of the wax particles in the resin layer. In other words, in reality, it was confirmed that a whole distribution of wax particles was equivalent to an average value measured at several areas in the length on the order of 100 μm in a relationship between a distribution of wax particles (a wax-occupation percentage to the surface of the resin layer and a number of wax particles in the interior of the resin layer) and a formability, as stated hereinafter.

(3) Explanation of Resin-Coated Aluminum Alloy Sheet Material for Aluminum Electrolytic Capacitor Case According to the Present Invention (i) The resin-coated aluminum alloy sheet material includes the resin layer 1 containing wax composed of at least one of polyethylene wax and carnauba wax.

For a kind of wax using in the resin-coated aluminum alloy sheet material for the aluminum electrolytic capacitor case according to the present invention, if a sole kind of wax is used, polyethylene wax is desirable. Polyethylene wax having a variety of particle sizes is commercially available, not only can a distribution of wax particles according to the present invention be easily obtained by using polyethylene wax, but also a lubricant property of polyethylene wax is superior to another kind of wax although the other kind of wax has a similar distribution to that of polyethylene wax. When a wax-mixture composed of polyethylene wax and carnauba wax is used, the lubricant property can be further improved. It is desirable that a rate of polyethylene wax to carnauba wax falls within a range between 1:4 and 4:1. This is because an effect obtained when either polyethylene wax or carnauba has a smaller rate than that defined on the above is equivalent to that obtained when only one of the kinds of wax is used.

Also, for a kind of resin forming the resin layer 1, it is possible to use a curing agent addition type epoxy-series resin, a self-crosslink epoxy-series resin, a polyester/melamine-series resin, a polyester/isocyanate-series resin, an amino-alkyd-series resin, a vinyl chloride-series resin and so forth may be used. For a curing agent for the epoxy-series resin, a usual resin for curing the epoxy-series resin may be used. Concretely, it is possible to use an amino-series type such as urea, melamine, benzoguanamine, acetoguanamine or the like, a phenol-series type such as cresol, butylphenol, phenol or the like, an isocyanate-series type such as hexamethylene isocyanate, isophorone di-isocyanate or the like, and so forth. It is preferable that an amount of addition of the curing agent is from 1 to 30 wt % in the resin layer. Although a curing condition of a resin layer is variable by a combination of a resin and a curing agent, especially, the epoxy/urea-series resin and the polyester/isocyanate-series resin are desirable because the resin layer can exhibit a suitable softness and adhesion property, and because it is possible to obtain a superior formability.

It is more preferable that a resin (base resin) forming the resin layer 1 includes at least an epoxy-series resin as a main component. This epoxy-series resin features a number average molecular weight falling within a range from at least 5,000 to at most 13,000 (in a weight average molecular weight, a range from at least 40,000 to at most 90,000 is desirable).

As the molecular weight of the epoxy-series resin becomes larger, the more elongated molecules are entangled with each other, and thus a freedom of displacement among the molecules becomes larger so as to give the resin layer a large stretchability. As a result, it is possible to improve a following ability of the resin layer to an aluminum sheet during a formation process.

When the number average molecular weight exceeds 13,000 (i.e., when the weight average molecular weight exceeds 90,000), the resin layer has a tendency toward decreasing an adhesion property, resulting in spoilage of the improvement of the formability. More desirably, the number average molecular weight is from at least 7,000 to at most 11,000 (the weight average molecular weight is from at least 40,000 to at most 83,000). When the resin layer is formed using a coating material by a coating process, a number average molecular weight of an epoxy resin is measured by using GPC (Gel Permeation Chromatography).

For a surface treatment of a substrate for the resin layer 1, there is a phosphate-chromate treatment which is conventionally used for aluminum alloy, and it is possible to use another treatment, such as a no-rinse-type chromate treatment and non-chromate treatment by paying attention to an environment or the like. For the non-chromate treatment, it is possible to use a reaction-type phosphate-zirconate treatment, a phosphate-titanate treatment, a coating-type zirconium treatment or the like.

(ii) A cross-section thickness of the aforesaid resin layer 1 is from at least 2 μm to at most 22 μm when being cut in a direction perpendicular to a surface of the resin layer.

The thickness of the resin layer 1 must be from at least 2 μm to at most 22 μm. This is because the resin layer 1 is susceptible to rupture during a stretching process when the thickness is less than 2 μm, and because the resin layer 1 is subjected to damage when the thickness exceeds 22 μm in that, when a formation process is carried out by using a usual die for a capacitor case, a sufficient clearance can not be obtained between a punch and a dice so that a surface pressure becomes too large to thereby cause a lack of lubrication regardless of the addition of wax. Note that a preferable thickness of the resin layer 1 is from at least 5 μm to at most 14 μm.

(iii) A total of lengths of wax particles, which is defined when the wax particles are cut along a straight line 5 of 100 μm optionally drawn on the surface of the resin layer 1, is at least 10 μm.

According to the present invention, when the wax particles 2e and 2f are cut along the straight line 5 of 100 μm optionally drawn on the surface of the resin layer 1, the total of cutting lengths d1, d2, d3, d4, d5 and d6 of the wax particles is at least 10 μm.

At the beginning of a forming process, since it is necessary to sufficiently lubricate the die with the wax existing on the surface of the resin layer 1, the total (d1+d2+d3+d4+d5+d6) of the cutting lengths of the wax particles 2e and 2f must be at least 10 μm when the wax particles are cut along the straight line 5 of 100 μm optionally drawn on the surface of the resin layer 1, i.e., the occupation percentage of the wax to the surface of the resin layer 1 must be at least 10%.

When the wax-occupation percentage is less than 10%, the lubrication is insufficient at the beginning of the forming process to thereby cause damage of the resin layer 1 after the forming process. Preferably, the wax-occupation percentage is at least 20%. Especially, since there is no upper limit, the surface of the resin layer 1 may be covered at 100% with wax.

(iv) A number of the wax particles 2a, 2d, which have a cross-sectional shape featured by a major axis extent having a length of at most 80% of the thickness of the resin layer 1 and of at least 0.1 µm, and which exist in a cross-sectional area of the resin layer defined by using the straight line 5 of 100 µm as a side thereof, falls within a range from at least 3 to at most 50.

When the resin layer 1 is stretched to a certain degree, the wax particles, which have the cross-sectional shape featured by the major axis extent having a length of at most 80% of the thickness of the resin layer 1 and of at least 0.1 µm, and which are from at least 3 to at most 50, must exist as the wax oozed from the interior of the resin layer 1 for the lubrication.

The wax particles 2a and 2d having the cross-sectional shape, the major axis extent of which has the length of at most 80% of the thickness of the resin layer 1, are defined as the wax particles 2a and 2d featuring the smaller cross-sectional shape than the circle 4 having a diameter which is at most 80% of the thickness of the resin layer 1 shown in FIG. 1. The cross-sectional shape of the wax particles 2a and 2d is encompassed by the circle 4 without being outwardly extended therefrom when the circle 4 is put over each of the cross-sections of the wax particles 2a and 2d.

The wax particles having the cross-sectional shape, the major axis extent of which has the length of at least 0.1 µm, are defined as the wax particles 2a, 2c and 2d having the larger cross-sectional shape than a circle 6 having a diameter of 0.1 µm, as shown in FIG. 1. Each of the cross-sectional shapes of the wax particles 2a, 2c and 2d is not encompassed by the circle 6 so that the major axis section concerned is outwardly extended from the circle 6 when the circle 6 is put over each of the cross-sections of the wax particles 2a, 2c and 2d. In the resin layer 1 shown in FIG. 1, a wax particle 2b is not the wax particle having the major axis extent having the length of at least 0.1 µm.

If all of the wax particles 2 existing in the interior of the resin layer 1 are the was particles 2a featuring the smaller major axis extent than the 0.1 µm diameter circle, the resin layer 1 could be subjected to large damage. This is because a sufficient lubrication can not be obtained when the wax particles existing in the interior of the resin layer 1 are too small although the wax is added to the resin layer.

The wax particles 2a and 2d existing within the range between at least 3 and at most 50 must be featured by the major axis extent which has the length of at most 80% of the thickness of the resin layer 1. Because the coated layer can be prevented from being easily ruptured by the fact that the wax particle 2c featuring a larger major axis extent than the length of at most 80% of the thickness of the resin layer 1 may cause a rupture occurring point. Note that the number of the wax particles is preferably from at least 8 to at most 34.

(v) A number of the wax particles 2c, which have a cross-sectional shape featured by a major axis extent having a length of more than 80% of the thickness of the resin layer, and which exist in the cross-sectional area of the resin layer defined by using the straight line 5 of 100 µm as a side thereof, is less than 10.

When the wax particles 2c observed in the interior of the resin layer 1, which have the cross-sectional shape featured by the major axis extent having the length of more than 80% of the thickness of the resin layer, i.e., the wax particles 2c having a large size which exceeds that of the circle 4 having 80% of the thickness of the resin layer 1, are increased so that the size of the wax particles existing in the interior of the resin layer 1 is too large, each of these wax particles may cause a rupture occurring point, and thus the resin layer 1 may be subjected to disadvantageous large damage.

Accordingly, when the cross-sectional area of the resin layer 1 defined by using the straight line 5 of 100 µm as a side thereof is observed, the number of the wax particles 2c having the cross-sectional shape, the size of which exceeds that of the circle 4 having 80% of the thickness of the resin layer 1, must be less than 10. Preferably, the number of the wax particles 2c is less than 5.

Note, it is preferable that the number of the wax particles 2 existing in the cross-sectional area cut along the straight line extent 5 of 100 µm optionally drawn on the surface of the resin layer 1 is from at least 3 to at most 50. When the number of the wax particles is less than 3, a sufficient lubrication can not be obtained although the wax particles have a large size. When the number of the wax particles exceeds 50, a portion easily becoming rupture occurring point is increased when the resin layer 1 is stretched although the size of the wax particles is small. As a result, the resin layer 1 is susceptible to damage.

(4) Method for Producing Resin-Coated Aluminum Alloy Sheet Material for Aluminum Electrolytic Capacitor Case According to the Present Invention (i) Laminating or Coating In order to produce a resin-coated aluminum alloy sheet material for an aluminum electrolytic capacitor case by making the wax particle 2 exist in the resin layer 1 so that the aforesaid conditions of the present invention can be satisfied, is previously prepared a resin material to which wax is added, and in which a concentration of wax is adjusted so that a total of lengths of wax particles 2, which are defined when the wax particles are cut along a straight line 5 of 100 µm optionally drawn on a surface of a resin layer could at least 10 µm, and so that a number of the wax particles 2, which have a cross-sectional shape featured by a major axis extent having a length of at most 80% of the thickness of the resin layer and of at least 0.1 µm, and which exist in a cross-sectional area of the resin layer defined by using the straight line 5 of 100 µm as a side thereof, could fall within a range from at least 3 to at most 50, and then the prepared material may be extruded and laminated.

However, a coating process is advantageous when production cost is taken into consideration, and, in the coating process, an average diameter of wax particles and an amount of addition of wax particles are controlled so that a total of lengths of wax particles 2, which are defined when the wax particles are cut along a straight line 5 of 100 µm optionally drawn on a surface of a resin layer, could be at least 10 µm, so that a number of the wax particles 2, which have a cross-sectional shape featured by a major axis extent having a length of at most 80% of the thickness of the resin layer and of at least 0.1 µm, and which exist in a cross-sectional area of the resin layer defined by using the straight line 5 of 100 µm as a side thereof, could fall within a range from at least 3 to at most 50, and so that a number of the wax particles 2, which have a cross-sectional shape featured by a major axis extent having a length of more than 80% of the thickness of the resin layer, and which exist in the cross-sectional area of the resin layer defined by using the straight line 5 of 100 µm as a side thereof, could less than 10, then the prepared wax particles are added to a coating material, and subsequently a baking/coating process is carried out.

In this case, concretely, for the wax particles 2, the wax particles having an average size, which is at least 10% of the thickness of the resin layer 1, and which is less than 80% of the thickness of the resin layer 1, is used, and this wax is then added to a coating material at a range from at least 0.5 wt % to less than 5.0 wt % to a solid content of the coating material.

Thus, a wax distribution according to the present invention can be obtained by carrying out a baking process as explained below.

(ii) Baking Process after Coating

When the coating material is heated, a temperature of the coating material is elevated while a convection is caused in the coating material. When the temperature of the coating material goes beyond a melting point of the wax, the wax is changed into a liquid phase, and thus the wax is agitated so that the wax oozed on the surface of the coating material wetly extends over the surface of the coating material due to the fact that a surface energy of the wax is smaller than that of the base resin of the coating material. On the other hand, the wax particles 2 remaining in the interior of the coating material gather and grow into large-sized particles in accordance with the same principle as the so-called Ostwald growth. When the elevation of the temperature is too fast, the resin of the coating material cures before the wax particles 2 ooze from the coating material to the surface thereof. When the elevation of the temperature too slow, a large part of the wax particles 2 ooze from the coating material to the surface thereof, so that not only the amount of the wax particles 2 remaining in the interior of the resin layer 1 becomes smaller, but also the size of these wax particles 2 grows larger.

In order that the wax distribution according to the present invention can be obtained, as shown in FIG. 2, it is desirable that the temperature of the coating material is rapidly elevated to a level at which the wax is melted (Process 1), that the temperature of the coating material is maintained at a temperature range in which the wax is melted but the resin of the coating material can not be cured, until the amount of the wax oozed from the coating material to the surface thereof reaches the wax-occupation percentage at least 10% (Process 2), and thereafter, the temperature of the coating material is elevated to a level at which the resin can be cured at no less than a certain degree so that the growth of the interior wax particles is prevented by being fixed with the resin (Process 3). In Process 1, the temperature at which the wax is melted should be higher than the melting point of the added wax by at least 6° C. (when the wax is composed of some kinds of wax, the highest melting point is used). This is because the wax can not be sufficiently melted when the temperature is higher than the melting point of the wax by less than 6° C.

Also, as shown in FIG. 2, when a time, during which the temperature of the coating material is elevated to a level which is higher than the melting point of the wax by 6° C., is defined as T1 seconds, it is desirable that the time T1 is at most 10 seconds. This is because, when the time T1 exceeds 10 seconds, a solvent or water for dissolving or dispersing the resin component is evaporated so that a viscosity of the coating material is increased, and thus the sufficient ooze of the wax from the coating material to the surface thereof is prevented although the temperature is maintained at the level at which the resin can not be cured.

In Process 2, the temperature range, in which the wax is melted while the resin is not cured, is defined as the range between the temperature which is higher than the melting point of the wax by at least 6° C. and the temperature which is lower than the ultimately reaching temperature, at which the resin can be sufficiently cured, by at least 100° C. This is because the wax can not be sufficiently melted when the temperature is higher than the melting point of the wax by less than 6° C., and because the curing of the resin excessively progresses when the temperature is not lower than the ultimately reaching temperature, at which the resin can be sufficiently cured, by at least 100° C. In this temperature range, a temperature-maintaining time (T2-T1) is desirably from at least 3 seconds to less than 15 seconds. Herein, the time T2 (seconds) is defined as a time between a time point at which the baking process is started and a time point at which the temperature reaches the level which is lower than the ultimately reaching temperature by 100° C.

When the temperature-maintaining time is less than 3 seconds, the wax can not sufficiently ooze from the resin layer to the surface thereof. Also, when the temperature-maintaining time is no less than 15 seconds, a certain kind of resin may start to be cured. In Process 3, the temperature, at which the resin can be cured at no less than a certain degree so that the wax is fixed, is a temperature which is lower than the ultimately reaching temperature by 20° C. When a time, during which the temperature is elevated from the start of the baking process to the level which is lower than the ultimately reaching temperature by 20° C., is defined as T3 seconds, it is desirable that a time (T3-T2) is at most 20 seconds. This because there may be a case where the size of the interior wax particles is too large when the time (T3-T2) exceeds 20 seconds. The ultimately reaching temperature, at which the resin can be sufficiently cured, may be determined so that properties of the base resin are most demonstrated. In the epoxy resin, the ultimately reaching temperature is from 240° C. to 300° C., and, in the polyester resin, the ultimately reaching temperature is from 230° C. to 300° C.

Note, in order to coat an aluminum alloy sheet with the coating material at low cost, a method of continuously coating an aluminum alloy web with the coating material by using a roll coater is most suitable. In a case where the coating process is carried out by this method, since the coating material is baked by a baking oven which is divided into several baking zones, temperatures are set so as to coincide with the graph of FIG. 2 as much as possible. It is desirable that a baking time is from at least 10 seconds to at most 60 seconds. More desirably, the baking time is from at least 20 seconds to at most 45 seconds.

EXAMPLE

Examples 1 to 40 and Comparative Examples 41 to 48

1100-H24 aluminum sheets having a thickness of 0.3 mm were subjected to a degreasing process as a surface treatment of a substrate for coating, using a commercially available alkaline degreasing solution, and then were subjected to chemical conversion with a commercially available phosphate-chromate treatment solution. Then, as shown in Tables 1-1, 1-2 and 1-3, each of one-side surface of the aluminum sheets was coated with a coating material under a condition, to thereby form a coated layer thereon, and then the coated layer were subjected to a baking process, resulting in production of samples. The baking process was carried out by using a hot-air drying oven divided into three zones, and each of ambient temperatures was set at the zones so that each of ultimately reaching temperatures as shown in Table 1 could be obtained. The ultimately reaching temperature was measured by using a thermocouple. Note, in Table 1, the underlines in the columns represent significant features in the production conditions.

TABLE 1-1

| | Coating Solution | | | | | | | Conditions of Baking | | | | |
|---|---|---|---|---|---|---|---|---|---|---|---|---|
| | Base Resin | | Wax | | | | | Resin | | | | |
| No. | Kinds of Resin | Ultimately Reaching Temperature (° C.) | Kinds of Wax | Rate (%) | Melting Point (° C.) | Average Size in Coating Solution (μm) | Amount of Addition (wt %) | Layer Thickness (μm) | T1 (sec.) | T2 (sec.) | T3 (sec.) | Total Baking Time (sec.) |
| 1 | Epoxy/Urea-Based | 240 | Polyethylene | 100 | 90 | 2.2 | 1.8 | 8.7 | 9 | 23 | 38 | 60 |
| 2 | Epoxy/Urea-Based | 240 | Polyethylene | 100 | 90 | 2.2 | 1.8 | 8.1 | 9 | 20 | 39 | 60 |
| 3 | Epoxy/Urea-Based | 240 | Polyethylene | 100 | 90 | 2.2 | 1.8 | 7.6 | 6 | 10 | 26 | 60 |
| 4 | Epoxy/Urea-Based | 240 | Polyethylene | 100 | 90 | 2.2 | 1.8 | 8.0 | 2 | 5 | 15 | 60 |
| 5 | Epoxy/Urea-Based | 240 | Polyethylene | 100 | 90 | 2.2 | 1.8 | 8.0 | 3 | 5 | 15 | 60 |
| 6 | Epoxy/Urea-Based | 240 | Polyethylene | 100 | 90 | 2.2 | 4.8 | 8.5 | 6 | 15 | 29 | 40 |
| 7 | Epoxy/Urea-Based | 240 | Polyethylene | 100 | 90 | 2.2 | 3.5 | 8.8 | 6 | 15 | 29 | 40 |
| 8 | Epoxy/Urea-Based | 240 | Polyethylene | 100 | 90 | 2.2 | 3.7 | 8.3 | 6 | 15 | 29 | 40 |
| 9 | Epoxy/Urea-Based | 240 | Polyethylene | 100 | 90 | 2.2 | 1.3 | 7.9 | 6 | 15 | 29 | 40 |
| 10 | Epoxy/Urea-Based | 240 | Polyethylene | 100 | 90 | 2.2 | 1.1 | 8.1 | 6 | 15 | 29 | 40 |
| 11 | Epoxy/Urea-Based | 240 | Polyethylene | 100 | 90 | 2.2 | 0.5 | 8.8 | 6 | 15 | 29 | 40 |
| 12 | Epoxy/Urea-Based | 240 | Polyethylene | 100 | 90 | 7.4 | 3.2 | 8.6 | 6 | 15 | 29 | 40 |
| 13 | Epoxy/Urea-Based | 240 | Polyethylene | 100 | 90 | 5.5 | 2.8 | 8.5 | 6 | 15 | 29 | 40 |
| 14 | Epoxy/Urea-Based | 240 | Polyethylene | 100 | 90 | 3.9 | 2.7 | 8.3 | 6 | 15 | 29 | 40 |
| 15 | Epoxy/Urea-Based | 240 | Polyethylene | 100 | 90 | 0.8 | 4.6 | 2.5 | 6 | 15 | 25 | 40 |
| 16 | Epoxy/Urea-Based | 240 | Polyethylene | 100 | 90 | 1.4 | 3.7 | 3.7 | 6 | 15 | 25 | 40 |
| 17 | Epoxy/Urea-Based | 240 | Polyethylene | 100 | 90 | 2.2 | 3.5 | 4.4 | 6 | 15 | 24 | 40 |
| 18 | Epoxy/Urea-Based | 240 | Polyethylene | 100 | 90 | 4.8 | 2.6 | 12.8 | 6 | 18 | 30 | 40 |
| 19 | Epoxy/Urea-Based | 240 | Polyethylene | 100 | 90 | 5.8 | 2.2 | 14.9 | 6 | 15 | 29 | 40 |
| 20 | Epoxy/Urea-Based | 240 | Polyethylene | 100 | 90 | 5.8 | 1.5 | 21.3 | 6 | 15 | 29 | 40 |
| 21 | Epoxy/Urea-Based | 240 | Carnauba | 100 | 86 | 3.1 | 2.3 | 5.5 | 6 | 15 | 29 | 40 |
| 22 | Epoxy/Urea-Based | 240 | Carnauba | 100 | 86 | 3.1 | 2.4 | 8.6 | 6 | 15 | 29 | 40 |
| 23 | Epoxy/Urea-Based | 240 | Carnauba | 100 | 86 | 3.1 | 2.6 | 13.4 | 6 | 15 | 29 | 40 |

TABLE 1-2

| | Coating Solution | | | | | | | Conditions of Baking | | | | |
|---|---|---|---|---|---|---|---|---|---|---|---|---|
| | Base Resin | | Wax | | | | | Resin | | | | |
| No. | Kinds of Resin | Ultimately Reaching Temperature (° C.) | Kinds of Wax | Rate (%) | Melting Point (° C.) | Average Size in Coating Solution (μm) | Amount of Addition (wt %) | Layer Thickness (μm) | T1 (sec.) | T2 (sec.) | T3 (sec.) | Total Baking Time (sec.) |
| 24 | Epoxy/Urea-Based | 240 | Carnauba<br>Polyethylene | 82<br>18 | 86<br>90 | 2.2<br>3.1 | 2.4 | 8.4 | 6 | 15 | 29 | 40 |
| 25 | Epoxy/Urea-Based | 240 | Carnauba<br>Polyethylene | 77<br>23 | 86<br>90 | 2.2<br>3.1 | 2.5 | 8.6 | 6 | 15 | 29 | 40 |
| 26 | Epoxy/Urea-Based | 240 | Carnauba<br>Polyethylene | 56<br>44 | 86<br>90 | 2.2<br>3.1 | 2.3 | 8.3 | 6 | 15 | 29 | 40 |
| 27 | Epoxy/Urea-Based | 240 | Carnauba<br>Polyethylene | 24<br>76 | 86<br>90 | 2.2<br>3.1 | 2.2 | 8.7 | 6 | 15 | 29 | 40 |
| 28 | Epoxy/Urea-Based | 240 | Carnauba<br>Polyethylene | 17<br>83 | 86<br>90 | 2.2<br>3.1 | 2.3 | 8.6 | 6 | 15 | 29 | 40 |
| 29 | Epoxy/Urea-Based | 240 | Polyethylene | 100 | 110 | 2.5 | 2.4 | 8.8 | 6 | 15 | 29 | 40 |
| 30 | Epoxy/Urea-Based | 240 | Polyethylene | 100 | 140 | 4.0 | 2.6 | 9.0 | 6 | 15 | 29 | 40 |
| 31 | Epoxy/Phenol-Based | 260 | Carnauba<br>Polyethylene | 56<br>44 | 86<br>90 | 2.2<br>3.1 | 2.3 | 5.6 | 6 | 15 | 29 | 40 |
| 32 | Epoxy/Phenol-Based | 260 | Carnauba<br>Polyethylene | 56<br>44 | 86<br>90 | 2.2<br>3.1 | 2.3 | 9.2 | 6 | 18 | 29 | 40 |
| 33 | Epoxy/Phenol-Based | 260 | Carnauba<br>Polyethylene | 56<br>44 | 86<br>90 | 2.2<br>3.1 | 2.3 | 13.8 | 6 | 20 | 29 | 40 |
| 34 | Polyester/Melamine-Based | 250 | Carnauba<br>Polyethylene | 56<br>44 | 86<br>90 | 2.2<br>3.1 | 2.3 | 4.9 | 4 | 9 | 29 | 40 |
| 35 | Polyester/Melamine-Based | 250 | Carnauba<br>Polyethylene | 56<br>44 | 86<br>90 | 2.2<br>3.1 | 2.3 | 9.4 | 6 | 13 | 29 | 40 |
| 36 | Polyester/Isocyanate-Based | 230 | Carnauba<br>Polyethylene | 56<br>44 | 86<br>90 | 2.2<br>3.1 | 2.3 | 8.5 | 6 | 17 | 29 | 40 |

TABLE 1-3

| | Coating Solution | | | | | | | Conditions of Baking | | | | |
|---|---|---|---|---|---|---|---|---|---|---|---|---|
| | Base Resin | | Wax | | | | | Resin | | | | |
| No. | Kinds of Resin | Ultimately Reaching Temperature (°C.) | Kinds of Wax | Rate (%) | Melting Point (°C.) | Average Size in Coating Solution (μm) | Amount of Addition (wt %) | Layer Thickness (μm) | T1 (sec.) | T2 (sec.) | T3 (sec.) | Total Baking Time (sec.) |
| 37 | Polyester/Isocyanate-Based | 230 | Carnauba | 56 | 86 | 2.2 | 2.3 | 13.1 | 6 | 19 | 29 | 40 |
| | | | Polyethylene | 44 | 90 | 3.1 | | | | | | |
| 38 | Epoxy/Urea-Based | 240 | Carnauba | 56 | 86 | 2.2 | 2.3 | 8.6 | <u>13</u> | 23 | 35 | 60 |
| | | | Polyethylene | 44 | 90 | 3.1 | | | | | | |
| 39 | Epoxy/Urea-Based | 240 | Carnauba | 56 | 86 | 2.2 | 2.3 | 8.5 | <u>2</u> | <u>4</u> | 6 | 12 |
| | | | Polyethylene | 44 | 90 | 3.1 | | | | | | |
| 40 | Epoxy/Urea-Based | 240 | Carnauba | 56 | 86 | 2.2 | 3.5 | 8.7 | 6 | <u>15</u> | <u>40</u> | 60 |
| | | | Polyethylene | 44 | 90 | 3.1 | | | | | | |
| 41 | Epoxy/Urea-Based | 240 | Polyethylene | 100 | 90 | 2.2 | 0.5 | 5.6 | <u>2</u> | <u>4</u> | 29 | 40 |
| 42 | Epoxy/Urea-Based | 240 | Polyethylene | 100 | 90 | <u>5.4</u> | 2.3 | 3.4 | 6 | 15 | 29 | 40 |
| 43 | Epoxy/Urea-Based | 240 | Polyethylene | 100 | 90 | 2.2 | <u>7.6</u> | 7.8 | 6 | 12 | 29 | 40 |
| 44 | Epoxy/Urea-Based | 240 | Polyethylene | 100 | 90 | 2.2 | <u>0.3</u> | 4.4 | 6 | 12 | 29 | 40 |
| 45 | Epoxy/Urea-Based | 240 | Polyethylene | 100 | 90 | 2.2 | 2.1 | <u>1.5</u> | 6 | 12 | 18 | 40 |
| 46 | Epoxy/Urea-Based | 240 | Polyethylene | 100 | 90 | 2.2 | 19.2 | <u>24</u> | 6 | 15 | 29 | 40 |
| 47 | Epoxy/Urea-Based | 240 | <u>Lanolin</u> | 100 | 90 | 1.6 | 3.4 | 8.5 | 6 | 15 | 29 | 40 |
| 48 | Epoxy/Urea-Based | 240 | <u>Paraffin</u> | 100 | 40 | 1.4 | 3.2 | 6.9 | 6 | 15 | 29 | 40 |

In order to study wax distribution conditions of the samples, each of these samples was cut at five locations in a direction perpendicular to a surface of the coated resin layer, and each of the five cross-sectional areas was observed along a length of 100 μm by using a transmission electron microscope. Then, in the respective five locations of each sample, wax-occupation percentages on the surface of the resin layer were measured (the measured five values were averaged), and, in the respective five cross-sectional areas, numbers of wax particles were counted (the counted five values were averaged). Then, each of the samples was formed into aluminum electrolytic capacitor cases having various sizes, so that the outer surface of each capacitor case was defined by the resin-coated surface of each sample, and the resin layers of the capacitor cases were visually observed and evaluated after the formation. In the formation process, a volatile press oil having the dynamic viscosity of 1.6 mm²/s was used.

(Evaluation Standard of Formability)
⊚: No Change to Pre-formation Process
○: Occurrence of Very Small Cracks in Resin Layer and Slight Roughness on Surface of Resin Layer
Δ: Occurrence of Cracks in Resin Layer and Roughness on Surface of Resin Layer
X: Occurrence of Cracks in Resin Layer, Roughness on Surface of Resin Layer, Observation of Streaks in Resin Layer When ⊚ or ○ are obtained, a sufficient electrical insulation can be ensured. The evaluation results are shown in Tables 2-1, 2-2 and 2-3. Note, in Table 2, L/D represents a height/diameter ratio.

TABLE 2-1

| | | Wax Distribution in Resin Layer | | | Formability (Size Unit: mm) | | | |
|---|---|---|---|---|---|---|---|---|
| | | | Number of Wax Particles in Resin Layer | | | | | |
| | No. | Occupation Percentage on Resin Layer Surface (%) | Wax Particles Having Major Axis of from 0.1 μm to 80% of Resin Layer Thickness | Wax Particles Larger More Than Circle Having Diameter of 80% of Resin Layer Thickness | φ6.3 × 7 L/D = 1.11 | φ4 × 5.5 L/D = 1.38 | φ4 × 6.3 L/D = 1.58 | φ4 × 7.0 L/D = 1.75 |
| Examples of The Invention | 1 | <u>89.6</u> | 6.1 | 1.7 | ⊚ | ⊚ | ○ | ○ |
| | 2 | <u>70.4</u> | 5.8 | 2.3 | ⊚ | ⊚ | ○ | ○ |
| | 3 | <u>25.6</u> | 6.0 | 2.1 | ⊚ | ⊚ | ○ | ○ |
| | 4 | <u>19.2</u> | 6.0 | 1.2 | ⊚ | ○ | ○ | ○ |
| | 5 | <u>12.8</u> | 17.6 | 1.2 | ⊚ | ○ | ○ | ○ |
| | 6 | 93.6 | <u>45.2</u> | 4.3 | ⊚ | ○ | ○ | ○ |
| | 7 | 78.0 | <u>32.7</u> | 3.1 | ⊚ | ⊚ | ○ | ○ |
| | 8 | 80.4 | <u>27.0</u> | 3.4 | ⊚ | ⊚ | ○ | ○ |
| | 9 | 51.6 | <u>8.8</u> | 1.3 | ⊚ | ⊚ | ○ | ○ |
| | 10 | 49.2 | <u>7.6</u> | 1.0 | ⊚ | ○ | ○ | ○ |
| | 11 | 42.0 | <u>3.5</u> | 0.4 | ⊚ | ○ | ○ | ○ |
| | 12 | 74.4 | 24.1 | <u>9.6</u> | ⊚ | ○ | ○ | ○ |
| | 13 | 69.6 | 20.8 | <u>6.3</u> | ⊚ | ○ | ○ | ○ |
| | 14 | 68.4 | 19.6 | <u>4.4</u> | ⊚ | ⊚ | ○ | ○ |
| | 15 | 91.2 | 10.1 | 3.7 | ⊚ | ○ | ○ | ○ |
| | 16 | 80.4 | 12.0 | 3.5 | ⊚ | ○ | ○ | ○ |
| | 17 | 78.0 | 13.5 | 3.9 | ⊚ | ⊚ | ○ | ○ |
| | 18 | 89.6 | 28.7 | 2.9 | ⊚ | ⊚ | ○ | ○ |
| | 19 | 62.4 | 28.5 | 3.0 | ⊚ | ○ | ○ | ○ |

TABLE 2-1-continued

| | | Wax Distribution in Resin Layer | | | | | |
| | | Number of Wax Particles in Resin Layer | | | | | |
| | | Occupation Percentage on Resin Layer Surface (%) | Wax Particles Having Major Axis of from 0.1 μm to 80% of Resin Layer Thickness | Wax Particles Larger More Than Circle Having Diameter of 80% of Resin Layer Thickness | Formability (Size Unit: mm) | | | |
| | No. | | | | φ 6.3 × 7 L/D = 1.11 | φ 4 × 5.5 L/D = 1.38 | φ 4 × 6.3 L/D = 1.58 | φ 4 × 7.0 L/D = 1.75 |
|---|---|---|---|---|---|---|---|---|
| | 20 | 54.0 | 27.5 | 1.4 | ◎ | ○ | ○ | ○ |
| | 21 | 63.6 | 11.0 | 4.5 | ◎ | ○ | ○ | ○ |
| | 22 | 64.2 | 17.6 | 3.0 | ◎ | ○ | ○ | ○ |
| | 23 | 66.6 | 29.8 | 2.1 | ◎ | ○ | ○ | ○ |
| | 24 | 64.8 | 17.6 | 3.1 | ◎ | ◎ | ◎ | ○ |

TABLE 2-2

| | | Wax Distribution in Resin Layer | | | | | | |
| | | Number of Wax Particles in Resin Layer | | | | | | |
| | | Occupation Percentage on Resin Layer Surface (%) | Wax Particles Having Major Axis of from 0.1 μm to 80% of Resin Layer Thickness | Wax Particles Larger More Than Circle Having Diameter of 80% of Resin Layer Thickness | Formability (Size Unit: mm) | | | |
| | No. | | | | φ 6.3 × 7 L/D = 1.11 | φ 4 × 5.5 L/D = 1.38 | φ 4 × 6.3 L/D = 1.58 | φ 4 × 7.0 L/D = 1.75 |
|---|---|---|---|---|---|---|---|---|
| Examples Of The Invention | 25 | 66.0 | 18.8 | 3.2 | ◎ | ◎ | ◎ | ◎ |
| | 26 | 63.0 | 16.3 | 2.9 | ◎ | ◎ | ◎ | ◎ |
| | 27 | 61.8 | 16.3 | 2.7 | ◎ | ◎ | ◎ | ◎ |
| | 28 | 63.0 | 16.9 | 2.8 | ◎ | ◎ | ◎ | ○ |
| | 29 | 64.8 | 18.4 | 2.4 | ◎ | ◎ | ○ | ○ |
| | 30 | 67.2 | 20.4 | 4.0 | ◎ | ◎ | ○ | ○ |
| | 31 | 63.0 | 11.0 | 3.1 | ◎ | ◎ | ◎ | ○ |
| | 32 | 84.0 | 17.8 | 1.5 | ◎ | ◎ | ◎ | ○ |
| | 33 | 98.0 | 26.4 | 0.8 | ◎ | ◎ | ◎ | ○ |
| | 34 | 36.3 | 10.7 | 4.4 | ◎ | ◎ | ◎ | ○ |
| | 35 | 49.0 | 18.6 | 2.1 | ◎ | ◎ | ◎ | ○ |
| | 36 | 77.0 | 16.5 | 1.7 | ◎ | ◎ | ◎ | ◎ |
| | 37 | 91.0 | 25.2 | 0.9 | ◎ | ◎ | ◎ | ◎ |
| | 38 | 11.0 | 17.5 | 1.7 | ◎ | ◎ | ◎ | ○ |
| | 39 | 14.0 | 17.2 | 0.3 | ◎ | ◎ | ◎ | ○ |
| | 40 | 63.0 | 17.0 | 5.5 | ◎ | ◎ | ◎ | ○ |
| Comparative Examples | 41 | 9.3 | 2.5 | 1.2 | ◎ | ◎ | ○ | △ |
| | 42 | 63.6 | 6.8 | 12.8 | ◎ | ◎ | ○ | △ |
| | 43 | 84.8 | 53.0 | 9.1 | ◎ | ◎ | ○ | △ |
| | 44 | 28.8 | 2.2 | 1.3 | ◎ | ○ | △ | △ |
| | 45 | 40.8 | 10.4 | 4.6 | ◎ | ◎ | ○ | △ |
| | 46 | 63.6 | 48.1 | 0.7 | ◎ | ○ | △ | △ |
| | 47 | 76.8 | 25.4 | 2.2 | ◎ | ◎ | ○ | △ |

TABLE 2-3

| | | Wax Distribution in Resin Layer | | | | | | |
| | | Number of Wax Particles in Resin Layer | | | | | | |
| | | Occupation Percentage on Resin Layer Surface (%) | Wax Particles Having Major Axis of from 0.1 μm to 80% of Resin Layer Thickness | Wax Particles Larger More Than Circle Having Diameter of 80% of Resin Layer Thickness | Formability (Size Unit: mm) | | | |
| | No. | | | | φ 6.3 × 7 L/D = 1.11 | φ 4 × 5.5 L/D = 1.38 | φ 4 × 6.3 L/D = 1.58 | φ 4 × 7.0 L/D = 1.75 |
|---|---|---|---|---|---|---|---|---|
| Comparative Examples | 48 | 74.4 | 24.1 | 1.8 | ◎ | ◎ | ○ | △ |

With the samples of the coating material and the conditions of the coating process shown in Table 1, in Nos. 1 to 30 sample pieces and Nos. 38 to 40 sample pieces which are the Examples of the present invention shown in Tables 2-1 to 2-3, the respective coating processes were carried out at the ultimately reaching temperature of 240° C., using an epoxy/urea-series resin as the base resin. Also, in Nos. 31 to 33 sample pieces, the respective coating processes were carried out at the ultimately reaching temperature of 260° C., using an epoxy/phenol-series resin as the base resin. Further, in Nos. 34 and 35 sample pieces, the respective coating processes were carried out at the ultimately reaching temperature of 250° C., using a polyester/melamine-series resin as the base resin. Also, in Nos. 36 and 37 sample pieces, the respective coating processes were carried out at the ultimately reaching temperature of 230° C., using polyester/isocyanate-series resin as the base resin.

On the other hand, regarding the wax, in Nos. 1 to 20 sample pieces and Nos. 29 and 30 sample pieces, the respective coating processes were carried out, using 100% polyethylene wax, and, in Nos. 21 to 23 sample pieces, the respective coating processes were carried out, using 100% carnauba wax. In contrast, in Nos. 24 to 28 sample, the respective coating processes were carried out, using carnauba/polyethylene wax with a mixing rate falling within a range from 82%/18% to 17%/83%. Further, in Nos. 31 to 40 sample pieces, the coating process was carried out, using carnauba/polyethylene wax with a mixing rate of 56%/44%.

Regarding the conditions of the baking process, in Nos. 1 to 14 sample pieces, No. 22 sample piece, Nos. 24 to 30 sample pieces, No. 32 sample piece, No. 35 and 36 sample pieces, and Nos. 38 to 40 sample pieces, the resin layers were subjected to the respective baking processes so as to have a thickness falling within a range from 7.6 µm to 9.4 µm. In contrast, in Nos. 15 to 20 sample pieces, the resin layers were subjected to the respective baking processes so as to have a thickness falling within a range from 2.5 µm to 21.3 µm. Further, in Nos. 21, 23, 33 and 37 sample pieces, the resin layers were subjected to the respective baking processes so as to have a thicknesses of 5.5 µm, 13.4 µm, 13.8 µm and 13.1 µm, respectively.

In Nos. 1 to 40 sample pieces, either the epoxy-series resin or the polyester-series resin was used as the base resin. Thus, these sample pieces meet the conditions stated in claim 3. Especially, Nos. 31 to 33 sample pieces were characterized in that the epoxy/phenol-series resin was used as the base resin, Nos. 34 and 35 sample pieces were characterized in that the polyester/melamine-series resin was used as the base resin, and Nos. 36 and 37 sample pieces were characterized in that the polyester/isocyanate-series resin was used as the base resin.

Also, regarding the wax, in Nos. 1 to 40 sample pieces, the wax was composed of at least one of polyethylene wax and carnauba wax. Thus, the sample pieces meet the conditions stated in claim 1. Also, in Nos. 24 to 28 sample, the respective coating processes were carried out, using carnauba/polyethylene wax with the mixing rate falling within the range from 82%/18% to 17%/83%, and, in Nos. 31 to 40 sample pieces, the coating process was carried out, using carnauba/polyethylene wax with the mixing rate of 56%/44%. Among these sample pieces, Nos. 25 to 27 sample pieces meet the conditions of claim 2 featuring the rate of polyethylene wax to carnauba wax falling within the range between 1:4 and 4:1.

Also, regarding the conditions of the baking process, in Nos. 1 to 14 sample pieces, No. 22 to 30 sample pieces, No. 32 sample piece, No. 35 and 36 sample pieces, and Nos. 38 to 40 sample pieces, the resin layers were subjected to the respective baking processes so as to have a thickness falling within the range from 7.6 µm to 13.4 µm. Thus, the sample pieces meet the conditions of claim 1 in which it is specified that the resin layer has the cross-section thickness falling within the range from at least 2 µm to at most 22 µm. Further, in Nos. 15 to 20 sample pieces, the resin layers were subjected to the respective baking processes so as to have a thickness falling within the range from 2.5 µm to 21.3 µm so that can be supported the numerical critical significance of claim 1 in which it is specified that the resin layer has the cross-section thickness falling within the range from at least 2 µm to at most 22 µm.

Further, in Nos. 1 to 40 sample pieces which are the Examples of the present invention, as shown in Tables 2-1, 2-2 and 2-3, a wax-occupation percentage on a surface of any one of the resin layers, i.e., a total length of the chords of the wax particles, which exist on a straight line of 100 µm extent optionally drawn on the surface of the resin layer, was at least 10 µm (10%). Thus, these sample pieces meet the conditions stated in claim 1. Especially, Nos. 1 to 5 sample pieces were produced under the same conditions except for the conditions of the baking processes, and the wax occupation percentages falling within the range from 86.9% to 12.8% were obtained in each different baking condition. Also, in Nos. 38 and 39 sample pieces, the respective wax occupation percentages were 11.0% and 14.0% which were approximate to the lower limit specified in claim 1.

Also, regarding a numbers of wax particles in an interior of a resin layers, in Nos. 1 to 40 sample pieces which are the Examples of the present invention, as shown in Tables 2-1, 2-2 and 2-3, any one of the sample piece meets the conditions of claim 1 in which it is specified that the number of the wax particles, which have the cross-sectional shape featured by the major axis extent having the length of at most 80% of the thickness of the resin layer and of at least 0.1 µm, falls within the range from at least 3 to at most 50. Especially, in Nos. 6 to 11 sample pieces, the numbers of the wax particles fell within the range from 3.5 to 45.2, and were different from each other. In No. 6 sample piece, the number of the wax particles was 45.2 which was approximate to the upper limit specified in claim 1, and, in No. 11 sample piece, the number of the wax particles was 3.5 which was approximate to the lower limit specified in claim 1, whereby a technical significance for the conditions of claim 1 is exhibited.

Further, in any one of Nos. 1 to 40 sample pieces which are the Examples of the present invention, a number of wax particles, which was featured by a major axis extent having a length of more than 80% of the thickness of the resin layer, i.e., wax particles having a large size more than that of a circle having 80% of the thickness of the resin layer, was less than 10, and, in the sample pieces rather than Nos. 12, 13 and 40 sample pieces, the number of the wax particles was less than 5. Especially, in No. 12 sample piece, the number of the wax particles was 9.6 which was approximate to the upper limit specified in claim 1, and No. 40 sample piece was featured by 5.5 exceeding 5.

The resin layers of the Examples according to the present invention have the features as mentioned above, and any one of the resin layers exhibits a superior lubricating property so that a sufficient and practical electrical insulation property can be obtained even in formation of an aluminum electrolytic capacitor case having a large height/diameter ratio.

Especially, Nos. 25 to 27 sample pieces and Nos. 36 and 37 sample pieces exhibited a superior formability (⊚), so that there was no change in the resin layers in comparison with the previous them not subjected to the formation processes even under the severe formation conditions of L/D=1.75.

On the other hand, regarding Nos. 41 to 48 sample pieces which are the Comparative Examples, the respective coating processes were carried out at the ultimately reaching temperature of 240° C., using an epoxy/urea-series resin. Regarding the wax, in Nos. 41 to 46 sample pieces, 100% polyethylene wax was used, in No. 47 sample piece, lanolin wax was used, and, in No. 48 sample piece, paraffin wax was used. Thus, Nos. 47 and 48 sample pieces do not meet the conditions of claim 1 in which it is specified that the wax is composed of at least one of polyethylene wax and carnauba wax.

Regarding the conditions of the baking processes, in Nos. 41 to 44 sample pieces and Nos. 47 and 48 sample pieces, the resin layers were subjected to the respective baking processes so as to have a thickness falling within a range from 3.4 μm to 8.5. Also, in Nos. 45 and 46 sample pieces, the resin layers were subjected to the respective baking processes so as to have a thickness of 1.5 μm and 24 μm, respectively. Thus, Nos. 45 and 46 sample pieces do not meet the conditions of claim 1 in which it is specified that the resin layer has the thickness falling within the range from at least 2 μm to at most 22 μm.

In No. 41 sample piece, an amount of addition of the wax was somewhat less, i.e., 0.5 wt %, and (T2-T1) was too short, so that a wax occupation percentage was lacking as 9.3%. Thus, No. 41 sample piece does not meet the conditions of claim 1 in which it is specified that the total length of the chords of the wax particles, which exist on the straight line of 100 μm optionally drawn on the surface of the resin layer, is at least 10 μm (10%). Thus, when the aluminum electrolytic capacitor case was produced under the formation conditions of the height/diameter ratio of 1.75 (L/D=1.75), the cracks occurred in the resin layer, and the surface of the resin layer became rough (Δ). Therefore, it was found that the formability was insufficient.

In No. 42 sample piece, a number of the wax particles featured by the major axis extent having a length of more than 80% of the thickness of the resin layer was 12. 8 which was more than the upper limit, i.e., 10, of the conditions of claim 1 in which it is specified that the number of the wax particles featured by the major axis extent having the length of more than 80% of the thickness of the resin layer, i.e., the wax particles having the larger size more than that of the circle having 80% of the thickness of the resin layer, is less than 10. Thus, due to the fact that the average size of the wax particles was too large with respect to the thickness of the resin layer, when the aluminum electrolytic capacitor case was produced under the formation conditions of the height/diameter ratio of 1.75 (L/D=1.75), the cracks occurred in the resin layer, and the surface of the resin layer became rough (Δ). Therefore, it was found that the formability was insufficient.

In No. 43 sample piece, since an amount of addition of the wax was relatively large, i.e., 7.6 wt %, a number of wax particles, which have a cross-sectional shape featured by a major axis extent having a length of at most 80% of the thickness of the resin layer and of at least 0.1 μm, was 53 which exceeded the upper limit, i.e., 50, of the condition of claim 1 in which it is specified that the number of the wax particles, which have the cross-sectional shape featured by the major axis extent having the length of at most 80% of the thickness of the resin layer and of at least 0.1 μm, falls within the range from at least 3 to at most 50. Thus, when the aluminum electrolytic capacitor case was produced under the formation conditions of the height/diameter ratio of 1.75 (L/D=1.75), the cracks occurred in the resin layer, and the surface of the resin layer became rough (Δ). Therefore, it was found that the formability was insufficient.

On the other hand, in No. 44 sample piece, since an amount of addition of the wax was too small, i.e., 0.3 wt %, a number of wax particles, which have a cross-sectional shape featured by a major axis extent having a length of at most 80% of the thickness of the resin layer and of at least 0.1 μm, was 2.2 which did not reach the lower limit, i.e., 3, of the condition of claim 1 in which it is specified that the number of the wax particles, which have the cross-sectional shape featured by the major axis extent having the length of at most 80% of the thickness of the resin layer and of at least 0.1 μm, falls within the range from at least 3 to at most 50. Accordingly, even under the production conditions of the height/diameter ratio of 1.38 (L/D=1.38), the very small cracks occurred in the resin layer, and the surface of the resin layer became slightly rough, and under the production conditions of the height/diameter ratio of 1.58, the cracks occurred in the resin layer, and the surface of the resin layer became rough. Thus, the aluminum electrolytic capacitor case could not be properly formed. In No. 45 sample piece, since a thickness of the resin layer was too small 1.5 μm, this sample piece did not meet the conditions of claim 1 in which it is specified that the resin layer has the thickness falling within the range from at least 2 μm to at most 22 μm. Thus, the aluminum electrolytic capacitor case having the height/diameter ratio of 1.75 could not be properly formed.

In No. 46 sample piece, since a thickness of the resin layer was too large, i.e., 24 μm, this sample piece did not meet the conditions of claim 1 in which it is specified that the resin layer has the thickness falling within the range from at least 2 μm to at most 22 μm. Accordingly, even under the production conditions of the height/diameter ratio of 1.38 (L/D=1.38), the very small cracks occurred in the resin layer, and the surface of the resin layer became slightly rough. Also, under the production conditions of the height/diameter ratio of 1.58 (L/D=1.58), the cracks occurred in the resin layer, and the surface of the resin layer became rough. Thus, the aluminum electrolytic capacitor case could not be properly formed. In No. 47 sample piece, since lanolin wax was used as the wax, the aluminum electrolytic capacitor case having the height/diameter ratio of 1.75 (L/D=1.75) could not be properly formed. In No. 48 sample piece, since paraffin wax was used as the wax, the aluminum electrolytic capacitor case having the height/diameter ratio of 1.75 (L/D=1.75) could not be properly formed.

EXAMPLE

Examples 49 to 56

1100-H24 aluminum sheets having a thickness of 0.3 mm were subjected to a degreasing process as a surface treatment of a substrate for coating, using an commercially available alkaline degreasing solution, and then were subjected to chemical conversion with a commercially available phosphate-chromate treatment solution. Then, as shown in Table 3, each of one-side surface of the aluminum sheets was coated with a coating material under a condition, to thereby form a coated layer thereon, and then the coated layer were subjected to a baking process, resulting in production of samples.

A number average molecular weight of each of the coating materials was measured by using GPC: HLC8020 by TOSO, a column: TSK-GEL G4000HXL (particle diameter 5 μm, rejection limit molecular weight (polystyrene) 10000+TSK-GEL G2000HXL (particle diameter 5 μm, rejection limit molecular weight (polystyrene) 4000000, an eluent: tetrahydrofuran, and a detector: RI.

The baking process was carried out by using a hot-air drying oven divided into three zones, and each of ambient temperatures was set at the zones so that each of ultimately reaching temperatures as shown in Table 3 could be obtained. The ultimately reaching temperature was measured by using a thermocouple.

TABLE 3

| | | Coating Solution | | | | | | | |
|---|---|---|---|---|---|---|---|---|---|
| | | Base Resin | | | Wax | | | | |
| | No. | Kinds of Resin | Curing Agent | Number Average Molecular Weight | Kinds of Wax | Rate (%) | Melting Point (° C.) | Average Size (μm) | Amount of Addition (wt %) |
| Examples of The Invention | 49 | Epoxy-Based | Urea Resin | <u>4900</u> | Polyethylene | 56 | 90 | 2.2 | 2.5 |
| | | | | | Carnauba | 44 | 86 | 3.1 | |
| | 50 | Epoxy-Based | Urea Resin | <u>5200</u> | Polyethylene | 56 | 90 | 2.2 | 2.5 |
| | | | | | Carnauba | 44 | 86 | 3.1 | |
| | 51 | Epoxy-Based | Urea Resin | <u>6700</u> | Polyethylene | 56 | 90 | 2.2 | 2.5 |
| | | | | | Carnauba | 44 | 86 | 3.1 | |
| | 52 | Epoxy-Based | Urea Resin | <u>7300</u> | Polyethylene | 56 | 90 | 2.2 | 2.5 |
| | | | | | Carnauba | 44 | 86 | 3.1 | |
| | 53 | Epoxy-Based | Urea Resin | <u>10500</u> | Polyethylene | 56 | 90 | 2.2 | 2.5 |
| | | | | | Carnauba | 44 | 86 | 3.1 | |
| | 54 | Epoxy-Based | Urea Resin | <u>11100</u> | Polyethylene | 56 | 90 | 2.2 | 2.5 |
| | | | | | Carnauba | 44 | 86 | 3.1 | |
| | 55 | Epoxy-Based | Urea Resin | <u>12700</u> | Polyethylene | 56 | 90 | 2.2 | 2.5 |
| | | | | | Carnauba | 44 | 86 | 3.1 | |
| | 56 | Epoxy-Based | Urea Resin | <u>13200</u> | Polyethylene | 56 | 90 | 2.2 | 2.5 |
| | | | | | Carnauba | 44 | 86 | 3.1 | |

| | | No. | Conditions of Baking | | | | | |
|---|---|---|---|---|---|---|---|---|
| | | | Resin Layer Thickness (μm) | T1 (sec.) | T2 (sec.) | T3 (sec.) | Total Baking Time (sec.) | Ultimately Reaching Temperature (° C.) |
| Examples of The Invention | | 49 | 8.1 | 6 | 15 | 29 | 40 | 240 |
| | | 50 | 8.4 | 6 | 15 | 29 | 40 | 240 |
| | | 51 | 8.0 | 6 | 15 | 29 | 40 | 240 |
| | | 52 | 7.7 | 6 | 15 | 29 | 40 | 240 |
| | | 53 | 8.1 | 6 | 15 | 29 | 40 | 240 |
| | | 54 | 8.4 | 6 | 15 | 29 | 40 | 240 |
| | | 55 | 7.4 | 6 | 15 | 29 | 40 | 240 |
| | | 56 | 8.2 | 6 | 15 | 29 | 40 | 240 |

(underline: significant condition in each production condition)

In order to study wax distribution conditions of the samples, each of these samples was cut at five locations in a direction perpendicular to a surface of the coated resin layer, and each of the five cross-sectional areas was observed along a length of 100 μm by using a transmission electron microscope. Then, in the respective five locations of each sample, wax-occupation percentages on the surface of the resin layer were measured (the measured five values were averaged), and, in the respective five cross-sectional areas, numbers of wax particles were counted (the counted five values were averaged). Then, by a 5-stage drawing-ironing formation process, each of the samples was formed into aluminum electrolytic capacitor cases having various sizes, so that the outer surface of each capacitor case was defined by the resin-coated surface of each sample, and the resin layers of the capacitor cases were visually observed and evaluated after the formation. In the formation process, a volatile press oil having the dynamic viscosity of 1.6 mm²/s was used.

(Evaluation Standard of Formability)

⊚: No Change to Pre-formation Process

○: Occurrence of Very Small Cracks in Resin Layer and Slight Roughness on Surface of Resin Layer Δ: Occurrence of Cracks in Resin Layer and Roughness on Surface of Resin Layer X: Occurrence of Cracks in Resin Layer, Roughness on Surface of Resin Layer, Observation of Streaks in Resin Layer When ⊚ or ○ are obtained, a sufficient electrical insulation can be ensured. The evaluation results are shown in Table 4. Note, in Table 4, L/D represents a height/diameter ratio.

TABLE 4

| | No. | Wax Distribution in Resin Layer | | | Formability (Size Unit: mm) | | | | |
|---|---|---|---|---|---|---|---|---|---|
| | | Occupation Percentage on Resin Layer Surface (%) | Number of Wax Particles in Resin Layer | | | | | | |
| | | | Wax Particles Having Major Axis Extent from 0.1 μm to 80% of Resin Layer Thickness | Wax Particles Having Major Axis Larger Than 80% of Resin Layer Thickness | φ6.3 × 7 L/D = 1.11 | φ4 × 5.5 L/D = 1.38 | φ4 × 6.3 L/D = 1.58 | φ4 × 7.0 L/D = 1.75 | φ5 × 11 L/D = 2.2 |
| Examples of The Invention | 49 | 59.8 | 15.8 | 2.5 | ◎ | ◎ | ◎ | ○ | ○ |
| | 50 | 62.1 | 16.7 | 3.2 | ◎ | ◎ | ◎ | ◎ | ○ |
| | 51 | 61.4 | 16.3 | 2.6 | ◎ | ◎ | ◎ | ◎ | ○ |
| | 52 | 63.0 | 17.5 | 1.9 | ◎ | ◎ | ◎ | ◎ | ◎ |
| | 53 | 64.0 | 18.4 | 3.1 | ◎ | ◎ | ◎ | ◎ | ◎ |
| | 54 | 62.3 | 16.3 | 3.0 | ◎ | ◎ | ◎ | ◎ | ○ |
| | 55 | 32.9 | 17.9 | 2.0 | ◎ | ◎ | ◎ | ◎ | ○ |
| | 56 | 60.2 | 16.1 | 2.9 | ◎ | ◎ | ◎ | ○ | ○ |

In Nos. 49 to 56 sample pieces which are the Examples of the present invention shown in Table 3, the respective coating processes were carried out at the ultimately reaching temperature of 240° C., using an epoxy-series resin as the base resin. Also, in any one of the coating processes, a urea resin was used as a curing-agent. Thus, in any one of Nos. 49 to 56 sample pieces, the base resin was an epoxy-series resin.

On the other hand, regarding the wax, in any one of the sample pieces, the coating process was carried out, using polyethylene/carnauba wax with a mixing rate of 56%/44%.

Accordingly, in any one of Nos. 49 to 56 sample pieces, since the wax was composed of at least one of polyethylene wax and carnauba wax, these sample pieces meet the conditions of the present invention.

Regarding the conditions of the baking process, in Nos. 49 to 56 sample pieces, the resin layers were subjected to the respective baking processes so as to have a thickness falling within a range from 7.4 μm to 8.4 μm. Thus, the sample pieces meet the conditions of the present invention in which it is specified that the resin layer has the thickness falling within the range from at least 2 μm to at most 22 μm.

Further, in Nos. 49 to 56 sample pieces which are the Examples of the present invention, as shown in Table 4, a wax-occupation percentage on a surface of any one of the resin layers, i.e., a total length of chords of wax particles, which exist on a straight line of 100 μm optionally drawn on the surface of the resin layer, was at least 10 μm (10%). Thus, these sample pieces meet the conditions of the present invention.

Also, regarding a numbers of wax particles in an interior of a resin layers, in Nos. 49 to 56 sample pieces which are the Examples of the present invention, as shown in Table 4, any one of the sample piece meets the conditions of the present invention in which it is specified that the number of the wax particles, which have the cross-sectional shape featured by the major axis extent having the length of at most 80% of the thickness of the resin layer and of at least 0.1 μm, falls within the range from at least 3 to at most 50.

Further, in any one of Nos. 49 to 56 sample pieces which are the Examples of the present invention, a number of wax particles, which was featured by a major axis extent having a length of more than 80% of the thickness of the resin layer, i.e., wax particles having a large size more than that of a circle having 80% of the thickness of the resin layer, was less than 5.

The resin layers of the Examples according to the present invention have the features as mentioned above, and any one of the resin layers exhibits a superior lubricating property so that a sufficient and practical electrical insulation property can be obtained even in formation of an aluminum electrolytic capacitor case having a large height/diameter ratio.

INDUSTRIAL APPLICABILITY

It is possible to provide a resin-coated aluminum alloy sheet material for an aluminum electrolytic capacitor case wherein a sufficient electrical insulation property can be obtained when a capacitor case having a large height/diameter ratio is formed using a volatile press oil.

The invention claimed is:

1. A resin-coated aluminum alloy sheet material for an aluminum electrolytic capacitor case, comprising a resin layer composed of either an epoxy-based resin or a polyester-based resin and containing wax composed of at least one of polyethylene wax and carnauba wax, wherein:
   the resin layer has a cross-section thickness falling within a range from at least 2μm to at most 22μm when being cut in a direction perpendicular to a surface of the resin layer;
   total of lengths of wax particles, which are defined when the wax particles are cut along a straight line of 100μm optionally drawn on the surface of the resin layer, is at least 10μm;
   a number of the wax particles, which have a cross-sectional shape featured by a major axis extent having a length of at most 80% of the thickness of the resin layer and of at least 0.1μm, and which exist in a cross-sectional area of the resin layer defined by using the straight line of 100μm as a side thereof, falls within a range from at least 3 to at most 50; and
   a number of the wax particles, which have a cross-sectional shape featured by a major axis extent having a length of more than 80% of the thickness of the resin layer, and which exist in the cross-sectional area of the resin layer defined by using the straight line of 100μm as a side thereof, is less than 10.

2. A resin-coated aluminum alloy sheet material for an aluminum electrolytic capacitor case as set forth in claim 1, wherein said wax features a rate of polyethylene wax to carnauba wax falling within a range between 1:4 and 4:1.

3. A resin-coated aluminum alloy sheet material for an aluminum electrolytic capacitor case as set forth in claim 2, wherein the resin forming the resin layer includes the epoxy-series resin having a number average molecular weight falling within a range from at least 5,000 to at most 13,000 as a main component.

4. An aluminum electrolytic capacitor case using the resin-coated aluminum alloy sheet material for the aluminum electrolytic capacitor as set forth in claim 3.

5. An aluminum electrolytic capacitor using the aluminum electrolytic capacitor case as set forth in claim 4.

6. An aluminum electrolytic capacitor using the aluminum electrolytic capacitor case as set forth in claim 3.

7. An aluminum electrolytic capacitor case using the resin-coated aluminum alloy sheet material for the aluminum electrolytic capacitor as set forth in claim 2.

8. An aluminum electrolytic capacitor using the aluminum electrolytic capacitor case as set forth in claim 7.

9. A resin-coated aluminum alloy sheet material for an aluminum electrolytic capacitor case as set forth in claim 1, wherein the resin forming the resin layer includes the epoxy-series resin having a number average molecular weight falling within a range from at least 5,000 to at most 13,000 as a main component.

10. An aluminum electrolytic capacitor case using the resin-coated aluminum alloy sheet material for the aluminum electrolytic capacitor as set forth in claim 9.

11. An aluminum electrolytic capacitor using the aluminum electrolytic capacitor case as set forth in claim 10.

12. An aluminum electrolytic capacitor case using the resin-coated aluminum alloy sheet material for the aluminum electrolytic capacitor as set forth in claim 1.

13. An aluminum electrolytic capacitor using the aluminum electrolytic capacitor case as set forth in claim 12.

* * * * *